United States Patent

Troutman

[15] 3,636,327
[45] Jan. 18, 1972

[54] TOTAL CONDITIONED WEIGHT COMPUTER

[72] Inventor: Paul H. Troutman, Columbus, Ohio
[73] Assignee: Industrial Nucleonics Corporation
[22] Filed: Dec. 22, 1969
[21] Appl. No.: 887,084

[52] U.S. Cl..............................235/151.33, 73/73, 235/184
[51] Int. Cl. .......................................................G01n 5/02
[58] Field of Search..................73/73; 162/263; 235/151.33, 235/184, 185

[56] References Cited

UNITED STATES PATENTS 3,073,153   1/1963   Petitjean....................................73/73

*Primary Examiner*—Malcolm A. Morrison
*Assistant Examiner*—Edward J. Wise
*Attorney*—Lowe and King, William T. Fryer, III and C. Henry Peterson

[57] ABSTRACT

A system for computing total conditioned weight of a fiber sheet during manufacture responds to signals derived from moisture and basis weight gauges, a well as indications of suppressed zero value for basis weight and a conditioned weight factor. The signals and indications are combined in accordance with:

$$\Delta CW = K_{cw}(BW_s + \Delta BW)(1-M) - (BW_s + \Delta BW)M + \Delta BW$$
(a),             where:

$\Delta CW$ = the total conditioned weight deviation from a suppressed zero basis weight value;

$K_{cw}$ = conditioned weight factor;

$BW_s$ = suppressed basis weight value;

$\Delta BW$ = basis weight gauge output, as a deviation of basis weight from suppressed zero basis weight value; and $M$ = moisture percentage of total weight as derived from a moisture gauge.

10 Claims, 1 Drawing Figure

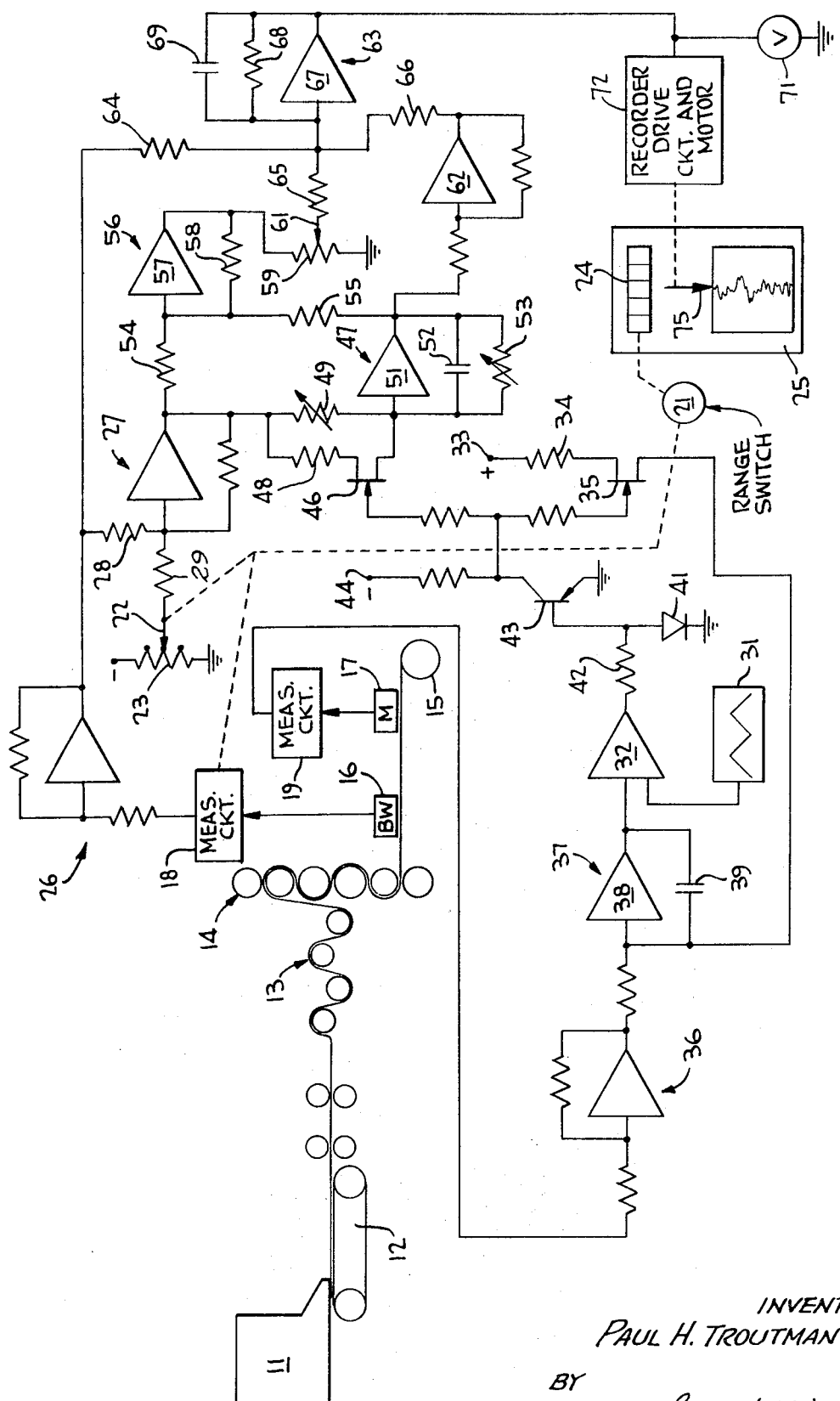

TOTAL CONDITIONED WEIGHT COMPUTER

The present invention relates generally to gauging systems for deriving indications of the fiber content of a fibrous sheet and, more particularly, to a system for deriving an indication of the total conditioned weight of a fibrous sheet relative to a suppressed zero basis weight value without deriving an indication of a value for suppressed zero total conditioned weight.

The fiber weight of a fibrous sheet, such as paper, is generally measured during the sheet manufacturing process in response to output signals derived from moisture and basis weight gauges located immediately upstream of takeup rolls for the sheet in accordance with:

$$BDBW = (BW)(1-M) \quad (1),$$

where:

$BDBW$ = fiber weight per unit area of the sheet monitored by the gauges, frequently referred to as bone-dry basis weight;

$BW$ = total basis weight or total weight per unit area of the sheet as derived from a basis weight gauge; and $M$ = the percentage of moisture in the sheet per unit area relative to the total weight of the sheet.

While some paper makers deal directly with bone-dry basis weight as an indication of fiber content, others are accustomed to inserting an empirically derived factor into the bone-dry basis weight indication and express fiber weight as pounds per ream in accordance with a parameter referred to as total conditioned weight. Total conditioned weight in pounds per ream is mathematically expressed as:

$$CW = (1+K_{cw})(BW)(1-M) \quad (2),$$

where:

$CW$ = total conditioned weight;

$K_{cw}$ = conditioned weight factor, which may vary between 0.00 and 0.12 and is selected by the paper maker;

$BW$ = basis weight in pounds per square foot; and $M$ = moisture as percentage basis weight.

While Equation (2) accurately reflects the mathematical formula for total conditioned weight, basis weight gauges and indicating equipment associated therewith typically have suppressed zero output signals or readouts. A suppressed zero signal or readout correlates a zero amplitude gauge output signal or readout with a finite, nonzero value of the property actually measured. For example, a typical total basis weight gauge includes a nucleonic source and detector. The detector has a response inversely proportional in amplitude to the weight per unit area of the material in a radiation field of the source. For differing types of materials and for different grades of the same material, optimum results from the gauge response are derived by correlating different values of weight per unit area to zero, i.e., by providing different suppressed zero values. The gauge output therefore is generally in actuality an analog signal indicative of the increment between the total basis weight value of the sheet being monitored relative to the suppressed zero value of the gauge. Readouts for the gauging systems are also frequently expressed in terms of a suppressed zero value, rather than an actual zero value, to provide monitoring personnel with indications of maximum sensitivity.

Those paper makers accustomed to dealing with total conditioned weight to provide indications of fiber weight also generally employ suppressed zero gauges and readouts, i.e., utilize a so-called suppressed arithmetic notation. Hence, it is common to express total conditioned weight as:

$$CW = CW_s + \Delta CW \quad (3),$$

where:

$CW_s$ = suppressed total conditioned weight; and $\Delta CW$ = incremental conditioned weight relative to the suppressed total conditioned weight.

As a typical example, an indicator on a recorder includes a scale reading for total-conditioned weight between 60 to 70 pounds per ream. In such a situation, the suppressed total-conditioned weight is 60 pounds per ream and the incremental conditioned weight variable varies between zero and 10 pounds per ream. Incremental total basis weight ($\Delta BW$) and suppressed total basis weight ($BW_s$) are similarly related to each other in accordance with:

$$BW = BW_s + \Delta BW \quad (4).$$

Substituting Equations (3) and (4) into Equation (2) and solving for incremental conditioned weight yields:

$$\Delta CW = (1+K_{cw})(BW_s+\Delta BW)(1-M) - CW_s \quad (5).$$

The straightforward manner, therefore, for automatically measuring incremental total conditioned weight is to provide an analog computer with constant inputs indicative of the predetermined quantities $K_{cw}$, $BW_s$ and $CW_s$ and variable inputs responsive to signals derived from basis weight and moisture gauges. The computer is arranged to solve Equations (5) directly and thereby derives an output voltage having an amplitude commensurate with the computed variables. An analog computer for solving Equation (5) in a straightforward manner requires circuitry for subtracting two voltages having amplitudes which, in terms of percentages, are nearly equal to each other. One voltage is proportional to total conditioned weight while the other is commensurate with the suppressed zero value of conditioned weight. As is well known, circuits for deriving the difference between two analog signals having approximately the same value are beset by problems with accuracy because a small deviation in one voltage from its prescribed value can result in a very large percentage error in the resultant signal.

I have found a technique enabling analog equipment to be utilized for the solution of Equation (5) without encountering the problem inherent in subtracting two voltages which are of approximately the same amplitude. This technique relies upon the realization that suppressed total conditioned weight, $CW_s$, and suppressed total basis weight, $BW_s$, are equal for systems working in suppressed arithmetic notation. In other words, in suppressed arithmetic notation, $BW_s - CW_s = 0$, i.e., $BW_s = CW_s$. By multiplying and rearranging, equation (5) can be rewritten as:

$$\Delta CW = K_{cw}(BW_s+\Delta BW)(1-M) - (BW_s+\Delta BW)M + \Delta BW + (BW_{BH} \times CW_s) \quad (6).$$

By substituting $BW_s = CW_s$ in Equation (6), the incremental total conditioned weight variable can be expressed as:

$$\Delta CW = K_{cw}(BW_s+\Delta BW)(1-M) - (BW_s+\Delta BW)M + \Delta BW \quad (7).$$

It is noted that the solution of Equation (7) does not require the subtraction of quantities approximately equal to each other.

The apparatus of the present invention includes an analog computer for solving Equation (7). Indications of the conditioned weight factor and suppressed total basis weight value are set into the computer circuitry by an operator adjusting the positions of potentiometer sliders. The computer is also responsive to moisture and basis weight gauge means deriving signals indicative of the quantities $\Delta BW$ and $M$ in Equation (7). From actual experiments conducted, it has been found that the problems of error propagation which would occur with an analog system solving Equation (5) are avoided with analog computer circuitry solving Equation (7).

It is, accordingly, an object of the present invention to provide a new and improved system for indicating the fiber weight of a fibrous sheet.

Another object of the present invention is to provide a new and improved system for indicating total conditioned weight of a fibrous sheet.

Another object of the present invention is to provide an analog computer system for computing total conditioned weight of a fibrous sheet in suppressed arithmetic notation wherein the need for subtracting two analog voltages having approximately the same magnitude is obviated.

Still another object of the present invention is to provide an analog computer system for determining the incremental total conditioned weight of a fibrous sheet by relying upon the equality between the suppressed values of total basis weight and total conditioned weight.

The above and still further objects, features and advantages of the present invention will become apparent upon consideration of the following detailed description of one specific embodiment thereof, especially when taken in conjunction with the accompanying drawing, wherein:

The sole FIGURE is a circuit diagram illustrating a preferred embodiment of the present invention.

Reference is now made to the single FIGURE of the drawing wherein a system for producing a fibrous sheet is shown as including the usual elements of headbox 11, Fourdrinier wire 12, dryer 13, press 14 and takeup reel 15. Positioned between press 14 and reel 15 are probes 16 and 17 for deriving analog signals indicative of the total basis weight and moisture content of the formed sheet. Typically, probe 16 is of the nucleonic type, while moisture gauge 17 is of the capacitive type. Signals derived from probes 16 and 17 are fed to measuring circuits 18 and 19, respectively.

Measuring circuit 18 responds to the output signal of probe 16 to derive a DC analog output signal having an amplitude directly proportional to the total weight per unit area of the finished sheet being monitored by the probe. To this end, circuit 18 includes circuitry known to those skilled in the art for linearizing the output of probe 16 to transform an inverse response of the probe as a function of the total weight per unit area of the sheet being monitored into a signal directly proportional to total weight per unit area monitored. The signal derived from measuring circuit 18 has only a positive excursion relative to a suppressed zero value for total basis weight. The zero value for the output of measuring circuit 18 is indicative of a finite value of total basis weight of the sheet being monitored set into the measuring circuit by range switch 21. In response to the total weight per unit area of the monitored portion of the sheet being above the suppressed zero value, the measuring circuit 18 derives an output signal linearly related to the deviation.

The output of capacitive measuring probe 17 is coupled to measuring circuit 19 which derives a DC analog signal having a voltage amplitude linearly proportional to the moisture percentage of the total weight of the finished sheet. The output signal of measuring circuit 19, unlike that of circuit 18, usually does not have a suppressed zero value, but may have such a value as indicated supra.

The output signals of circuits 18 and 19 are combined with an indication of suppressed total basis weight value manually set into measuring circuit 18 by an operator. To derive the indication of suppressed total basis weight, range switch 21 is provided and includes a plurality of detents for establishing different ranges. Range switch 21 includes a shaft that drive a potentiometer for establishing the suppressed zero in measuring circuit 18, as well as for adjusting the position of slider 22 on tapped potentiometer 23. The slider 22 is moved in predetermined increments between taps of potentiometer 23 so that predetermined voltages indicative of suppressed total basis weight are derived thereat in response to adjustment of the position of range switch 21. In the alternative a plurality of potentiometers and a switching network responsive to switch 21 for selectively connecting taps of the potentiometers can be provided for adjusting the suppressed zero. To provide a visual indication of the position of range switch 21, the range switch shaft is coupled to a numerical display 24 on recorder 25 and also can be coupled to printing wheels for imprinting the value of the selected range onto a record, such as a strip chart, produced by recorder 25.

The positive, DC output voltage of measuring circuit 18, indicative of incremental total basis weight, is reversed in phase by polarity inverting, negative unity gain amplifier circuit 26 which derives a DC output voltage commensurate with $(-\Delta BW)$. Amplifier circuit 26 includes a high gain DC operational amplifier and equal valued input and feedback resistors, as well known to those skilled in the art. The $(-\Delta BW)$ output signal of amplifier 26 is added with the suppressed zero basis weight $(BW_s)$ signal derived from tap 22 in summing amplifier circuit 27. Summing amplifier circuit 27 includes a DC phase inverting, high gain operational amplifier having plural input resistors 28 and 29 and a feedback resistor. The resistor values are appropriately selected so that circuit 27 derives an output signal directly proportional to $(BW_s+\Delta BW)$ which equals total basis weight.

The total basis weight output signal of amplifier 27 is multiplied with the output of measuring circuit 19. To this end, the output voltage of measuring circuit 19 is transformed into a variable pulse duration signal which selectively activates a gate that feeds the output of amplifier 27 to an integrator network. Multiplication of the total basis weight and moisture signals relies upon the principle of modulating the width of a pulse in response to the magnitude of a first signal, amplitude modulating the pulse in response to the level of a second signal and integrating the resultant variable amplitude and width pulse.

The circuit for converting the variable amplitude, DC output voltage of measuring circuit 19 into a pulse width modulated waveform includes a triangle oscillator 31, of a well-known type. The output of oscillator 31 is a series of essentially linear positive and negative going ramps following each other consecutively. The output of triangle wave generator 31 is fed to one input of comparator 32. Preferably, comparator 32 is a high gain, DC operational amplifier successively driven into positive and negative saturation in response to the voltage difference at its two input terminals so it functions as a high gain comparator.

The other input of comparator 32 is derived from integrator 37 that is driven by the output of measuring circuit 19 and a positive DC reference voltage at terminal 33. The voltage at terminal 33 is selectively coupled to the input of integrator 37 through current-limiting resistor 34 and the source drain path of field effect transistor 35, which functions as a switch. The output signal of measuring circuit 19 is fed to the integrator input through unity gain polarity reversing amplifier network 36. Thereby, the negative DC output voltage of amplifier network 36, having a level proportional to moisture, is combined in integrating circuit 37 with square waves varying between approximately the positive voltage of terminal 33 and ground as coupled through field-effect transistor 35. Integrating circuit 37 includes the usual DC operational amplifier 38, having a very high open-loop gain and phase-inverting properties, as well as feedback-integrating capacitor 39.

In response to the voltages applied to integrator 37, the integrator derives a ramp output voltage which progresses towards one saturation level of amplifier 38 at a rate determined by the output of measuring circuit 19 while field-effect transistor 35 is switched off. When transistor 35 is switched on, integrator 37 derives a ramp output voltage sloping toward the opposite saturation level of amplifier 38 at a rate indicative of the difference between the DC voltage at terminal 33 and the output of measuring circuit 19.

The triangular wave output of integrator 37 is compared with the voltage of triangular wave generator 31 in comparator 32 which derives positive and negative rectangular voltage waveforms having durations commensurate with the output voltage of measuring circuit 19. The positive portion of the waveform derived by comparator 32 is shunted to ground by diode 41, having its anode connected to the amplifier output by resistor 42 and its cathode connected directly to ground. The resulting clipped output voltage of amplifier 32 is fed to the base of PNP-bipolar transistor 43, which functions as a switch to sequentially drive the gate electrode of field-effect transistor 35 to ground or the negative voltage at terminal 44. In response to transistor 43 being activated to a cutoff state in response to a positive output voltage limited by diode 41 being derived by amplifier 32, the negative voltage at terminal 44 is coupled to the gate electrode of field-effect transistor 35 to cut off the field-effect transistor. Field-effect transistor 35 is activated to a conducting state in response to ground being applied to the gate electrode thereof while a negative voltage is applied to the base of transistor 43.

In a manner well known to those skilled in the art, the previously described circuit including integrator 37 and comparator 32 derives a variable width rectangular wave having a duration proportional to the voltage of measuring circuit 19. The variable duration wave applied to the gate electrode of field-effect transistor 35 is applied in parallel to the gate electrode of field-effect transistor 46. The source drain path of field-effect transistor 46 selectively connects the total basis weight indicating output voltage of amplifier 27 to one input of summing and smoothing circuit 47 through resistor 48. Thereby, the total basis weight indicating output voltage of amplifier 27 is gated through the source drain path of field-effect transistor 46 to the input of summing and smoothing circuit 47 for a time duration proportional to the output voltage of measuring circuit 19. Summing circuit 47 is thereby responsive to a rectangular wave form of variable duration proportional to the moisture of the sheet being monitored. The voltage amplitude of the variable duration wave fed to circuit 47 through field-effect transistor 46 is directly proportional to the output of amplifier 27 because the output of the amplifier appears as a voltage-driving source to the input of circuit 47. In addition to the variable duration waveform applied to the input of summing circuit 47 through the path comprising the source drain path of field-effect transistor 46, a signal directly proportional to the total basis weight is applied to the input of circuit 47 via variable resistor 49. Variable resistor 49 as included in the circuit to provide offset or a suppressed zero for the moisture indicating signal, if necessary. Under normal operation, the response of moisture gauge 17 and measuring circuit 19 provides an output that varies between zero and a finite percentage of the sheet total weight, e.g., between 0 and 10 percent. For certain types of paper it is desirable to extend the maximum moisture percentage beyond 10 percent, to 13 percent for example. However, it is also desirable to maintain a constant span on the moisture reading for facilitating readout on chart recorders or meters. For the above example, therefore, a 3 percent offset for moisture is provided in circuit 19 so that a 13 percent moisture indicating output signal of circuit 19 correlates with 10 percent moisture under normal operating conditions. The value of resistor 49 is adjusted to couple the required amount of the basis weight signal into amplifier 51 for the correct moisture offset. If no moisture offset is introduced, resistor 49 is an open circuit so that amplifier 51 is responsive only to the variable amplitude and width pulses coupled through field effect transistor 46. As the moisture offset is introduced, the value of resistor 49 is reduced to a finite value so that for increasing amounts of offset the value of the resistor is reduced.

Summing circuit 47 smooths the variable amplitude and width pulses fed thereto through field-effect transistor 46 into a DC voltage as well as the DC component coupled thereto through variable resistor 49. Summing circuit 47 includes a high gain, phase-inverting operational amplifier 51 and a negative feedback path between the amplifier input and output, in the form of a smoothing circuit including capacitor 52, shunted by variable resistor 53 that controls the gain of the summing circuit. The output signal of circuit 47 is a DC voltage indicative of the average value applied to the input of amplifier 51 through resistors 48 and 49 and having a value indicative of the product of total basis weight and moisture in the sheet being monitored.

The DC output voltage of circuit 47, indicative of the product of moisture and total basis weight of the sheet is added to a signal indicative of total sheet basis weight, the output voltage of amplifier 27. To this end, the output voltages of amplifier 27 and circuit 47 are respectively fed through resistors 54 and 55 to the input terminal of summing network 56. Summing network 56 includes a high gain, DC operational amplifier 57 having phase-inverting properties and feedback resistor 58. The output voltage of summing network 56 is applied to one end of multiturn potentiometer 59, the other end of which is grounded. Potentiometer 59 includes a slider 61, the position of which is preset by an operator in accordance with desired value of the conditioned weight factor, $K_{cw}$. Thereby, the voltage derived at slider 61 is directly proportional to the quantity:

$$K_{cw}(BW_s + \Delta BW)(1-M) \quad (8).$$

The incremental total basis weight output signal of amplifier 26 is combined with the voltage at tap 61 and a polarity inverted replica of the output of circuit 47, as coupled through phase inverting amplifier 62, in summing amplifier 63. To this end, the DC output voltage of amplifier 26, directly proportional to $(-\Delta BW)$, is fed via resistor 64 to the input of amplifier 63, while the DC voltage at tap 61 is fed to amplifier 63 input via resistor 65 and the output of amplifier 62, a DC voltage directly proportional to $-(BW_s + \Delta BW)M$, is fed to the amplifier 63 input via resistor 66. Summing circuit 63 includes a high gain DC operational amplifier 67, having phase inverting properties, as well as feedback resistor 68 and filter capacitor resistor 69. Summing circuit 63 responds to the three inputs thereof to derive a DC output voltage having an amplitude directly proportional with incremental conditioned weight of the sheet being monitored by basis weight and moisture probes 16 and 17. The summing amplifier responds to the three input signals thereof to compute $\Delta CW$ in accordance with Equation (7).

The output voltage of summing network 63 is applied in parallel to indicators in the form of voltmeter 71 and drive circuit 72 for pen 75 of strip chart recorder 25. Drive circuit 72 includes the usual motor for translating pen 75 across the recorder sheet to a position indicative of the output voltage of summing network 63. The position of pen 75 is indicative of the incremental variation of total conditioned weight relative to the suppressed zero value. Since the suppressed zero value is indicated on the recorder by a numerical display 24 and the incremental value is indicated by a line drawn on the chart by pen 75 complete total conditioned weight information is presented to the operator. Indications of conditioned weight deviations relative to the suppressed zero value are derived by reading meter 71, if desired.

While there has been described and illustrated one specific embodiment of the invention, it will be clear that variations in the details of the embodiment specifically illustrated and described may be made without departing from the true spirit and scope of the invention.

I claim:

1. A system for providing an indication of the fiber content of a fibrous sheet containing water-comprising gauge means responsive to the sheet for deriving first and second analog signals respectively indicative of the total basis weight and moisture content of the sheet, said total basis weight signal having a suppressed zero value corresponding with a predetermined non zero value of total basis weight, means for deriving a first indication commensurate with said predetermined, non zero value of total basis weight, means for deriving a second indication commensurate with a predetermined conditioned weight factor relating total basis weight and moisture to total conditioned weight, means combining said first and second indications with said first and second analog signals for deriving a third analog signal indicative of the total conditioned weight of the sheet relative to the suppressed zero total basis weight without deriving an indication of a value for suppressed zero conditioned weight.

2. The system of claim 1 wherein said third signal deriving means includes means combining said first and second indications with said first and second analog signals for deriving a fourth analog signal, and means algebraically combining said first and fourth analog signals for deriving said third signal.

3. The system of claim 1 wherein said means for deriving the third analog signal combines the first and second indications with said first and second analog signals in accordance with:

$K_{cw}(BW_s + \Delta BW)(1-M)$, where:
$K_{cw}$ = the value of the second indication
$BW_s$ = the value of the first indication
$\Delta BW$ = magnitude of the first analog signal
$M$ = magnitude of the second analog signal 4. The system of claim 1 further including means responsive to said first indication deriving means and said third signal deriving means for separately displaying the value of the predetermined nonzero value of total basis weight and the magnitude of the total conditioned weight relative to the predetermined nonzero value of total basis weight.

5. An analog computer for responding to first and second analog signals respectively derived by gauge means monitoring total basis weight and moisture of a fibrous sheet, said first signal having a suppressed zero value corresponding with a predetermined nonzero value of total basis weight, comprising means for deriving a first indication commensurate with said predetermined, nonzero value of total basis weight, means for deriving a second indication commensurate with a predetermined conditioned weight factor relating total basis weight and moisture to total conditioned weight, means combining said first and second indications with said first and second analog signals for deriving a third analog signal indicative of the total conditioned weight of the sheet relative to the suppressed zero total basis weight without deriving an indication of a value for suppressed zero conditioned weight.

6. The analog computer of claim 5 further including means responsive to said first indication deriving means and said third signal deriving means for separately displaying the value of the predetermined nonzero value of total basis weight and the magnitude of the total conditioned weight relative to the predetermined nonzero value of total basis weight.

7. The analog computer of claim 5 wherein said third signal deriving means includes means combining said first and second indications with said first and second analog signals for deriving a fourth analog signal, and means algebraically combining said first and fourth analog signals for deriving said third signal.

8. The analog computer of claim 5 wherein said means for deriving the third analog signal combines the first and second indications with said first and second analog signals in accordance with:

$K_{cw}(BW_s + \Delta BW)(1-M)$, where:
$K_{cw}$ = the value of the second indication
$BW_s$ = the value of the first indication
$\Delta BW$ = magnitude of the first analog signal
$M$ = magnitude of the second analog signal 9. In combination with a facility for fabricating a fibrous sheet from a mixture of fiber slurry, said facility including a dryer and takeup roll for the sheet, gauge means positioned between said dryer and takeup roll responsive to the sheet for deriving first and second analog signals respectively indicative of the total basis weight and moisture content of the sheet, said total basis weight signal having a suppressed zero value corresponding with a predetermined nonzero value of total basis weight, means for deriving a first indication commensurate with said predetermined, nonzero value of total basis weight, means for deriving a second indication commensurate with a predetermined conditioned weight factor relating total basis weight and moisture to total conditioned weight, means combining said first and second indications with said first and second analog signals for deriving a third analog signal indicative of the total conditioned weight of the sheet relative to the suppressed zero total basis weight without deriving an indication of a value for suppressed zero conditioned weight.

10. The combination of claim 9 further including means responsive to said first indication deriving means and said third signal deriving means for separately displaying the value of the predetermined nonzero value of total basis weight and the magnitude of the total conditioned weight relative to the predetermined nonzero value of total basis weight.

* * * * *